United States Patent
Zou et al.

(10) Patent No.: US 8,369,845 B2
(45) Date of Patent: Feb. 5, 2013

(54) METHOD AND SYSTEM TO SUBSCRIBE, CONFIGURE AND MOVE MOBILE TELEPHONE SOFTWARE SERVICE CONVENIENTLY

(75) Inventors: Shihong Zou, Beijing (CN); Yu Lin, Beijing (CN); Wenyong Shi, Beijing (CN)

(73) Assignee: NQ Mobile Lux S.A., Luxembourg (LU)

( * ) Notice: Subject to any disclaimer, the term of this patent is extended or adjusted under 35 U.S.C. 154(b) by 224 days.

(21) Appl. No.: 12/677,261

(22) PCT Filed: Aug. 21, 2008

(86) PCT No.: PCT/CN2008/001504
§ 371 (c)(1),
(2), (4) Date: May 12, 2010

(87) PCT Pub. No.: WO2009/033357
PCT Pub. Date: Mar. 19, 2009

(65) Prior Publication Data
US 2010/0279674 A1    Nov. 4, 2010

(30) Foreign Application Priority Data
Sep. 10, 2007   (CN) .......................... 2007 1 0121575

(51) Int. Cl.
*H04M 3/00*   (2006.01)
(52) U.S. Cl. .......................... 455/419; 455/418; 455/420
(58) Field of Classification Search .......... 455/418–420, 455/550.1, 557–558, 41.2, 508, 514, 517, 455/556.1–556.2, 560–561; 707/628, 621, 707/623, 631–632, 634, 640–641, 645–648, 707/653–654, 630, 638, 682; 717/120–121, 717/168, 172–174, 178
See application file for complete search history.

(56) References Cited

U.S. PATENT DOCUMENTS
(Continued)

FOREIGN PATENT DOCUMENTS
| CN | 1388926 | 1/2003 |
| CN | 1411183 | 4/2003 |

(Continued)

OTHER PUBLICATIONS
PCT/CN2008/001504, Oct. 27, 2008, International Search Report and written opinion.

*Primary Examiner* — Meless Zewdu
(74) *Attorney, Agent, or Firm* — Baker & McKenzie, LLP (57) ABSTRACT

Remotely configuring mobile telephone software based on subscription. A user's mobile telephone stores user description information and service description information related to the mobile telephone in a service management platform after installing and starting a mobile telephone service. The user logs on to the service management platform through access equipment, and subscribes to mobile telephone service modality and functions available after identity authorization. The user can configure service parameters through access equipment, download the mobile telephone service software or service description information from the service management platform, and install them to the user's mobile telephone after a subscription or configuration operation. The user can log on to the service management platform through a new mobile telephone when the mobile telephone is replaced. The mobile telephone service software and service description information used in the original mobile telephone can be moved to the new mobile telephone selectively or as a whole after identity authorization.

21 Claims, 3 Drawing Sheets

U.S. PATENT DOCUMENTS

| | | | |
|---|---|---|---|
| 5,881,235 A * | 3/1999 | Mills | 709/221 |
| 7,123,933 B2 * | 10/2006 | Poor et al. | 455/552.1 |
| 7,480,907 B1 * | 1/2009 | Marolia et al. | 717/174 |
| 7,624,134 B2 * | 11/2009 | Stakutis et al. | 1/1 |
| 2002/0123336 A1 | 9/2002 | Kamada | |
| 2002/0193094 A1 * | 12/2002 | Lawless et al. | 455/407 |
| 2003/0078036 A1 * | 4/2003 | Chang et al. | 455/419 |
| 2003/0134625 A1 * | 7/2003 | Choi | 455/418 |
| 2003/0186689 A1 * | 10/2003 | Herle et al. | 455/418 |
| 2004/0194080 A1 * | 9/2004 | Rao et al. | 717/173 |
| 2007/0149168 A1 | 6/2007 | Hariki | |
| 2007/0150617 A1 | 6/2007 | Hariki | |
| 2007/0150816 A1 | 6/2007 | Hariki | |
| 2007/0192443 A1 * | 8/2007 | Kim | 709/219 |
| 2007/0259678 A1 * | 11/2007 | Kuk et al. | 455/466 |

FOREIGN PATENT DOCUMENTS

| | | |
|---|---|---|
| CN | 101009573 | 8/2007 |
| CN | 101119387 | 2/2008 |
| JP | 2007-226773 | 9/2007 |
| KR | 2005-0068694 | 7/2005 |

* cited by examiner

METHOD AND SYSTEM TO SUBSCRIBE, CONFIGURE AND MOVE MOBILE TELEPHONE SOFTWARE SERVICE CONVENIENTLY

FIELD OF THE INVENTION

The present invention relates to a method and system, which are convenient to subscribe, configure and move mobile telephone software service focus on user, belong to the technical field of mobile communication and computer application.

TECHNICAL BACKGROUND

With the rapid development of microelectronic technique and computer technology, the intelligentized level of mobile chip reaches an unprecedented height. At present, many smart-phones have been powerful personal computer themselves. Various and powerful mobile telephone software mushroom one after another with the rapid development of mobile telephone hardware, for example, generally classifying popular mobile telephone software at present roughly to: multimedia (audio play, photo and video, audio-tools, graphics and images, various ring, ring DIY, video clips, etc.), system tools (system management, file management, tray safe, Chinese IME (Input Method Editor), Infrared and Bluetooth, etc.), application software (call auxiliary, business card memo, calendar clock, screensavers desktop, life application and documentation tools, etc.), network tools (network browser, instant messaging, e-mail tool, network support, etc.), and other classes such as mobile telephone game, GPS, e-book room and antivirus software, etc. Moreover, various kinds of new mobile software are springing up continuously, and spreading and penetrating to hundred millions of mobile telephone users. Furthermore, many other new mobile telephone communication service regarding the mobile telephone as the carrier are being researched and developed rapidly and continuously, and are accepted and used by number of users soon.

Traditional mobile telephone service software focuses on mobile telephone, and all kinds of service software should be reinstalled and reconfigured manually when mobile telephone is updated. However, the update of mobile telephone is more and more frequent nowadays. It is inconvenient for users to installed and configured mobile telephone service software manually because of various kinds of brand, model, style and function of mobile telephone. Furthermore, general mobile telephone users do not know much about computer knowledge, which greatly raises the application threshold of mobile telephone service software and limits the popularization of mobile telephone service software. Many skills in the art are interested in this problem and hope to solve this problem as soon as possible in order to promote the development, popularization and application of mobile telephone service.

SUMMARY OF THE INVENTION

Based on the above, the aim of the invention is to provide an implementation method and network system, which are convenient to subscribe, configure and move mobile telephone software service, focus on user. The invention solves current situation of the installation and application of mobile telephone service software which focuses on mobile telephone in traditional technique, so as to reduce the technical threshold for users to use mobile telephone service software. It is convenient for users to change mobile telephone, subscribe and configure individualization mobile telephone service software.

In order to achieve the above aim, the present invention provides an implementation method, which is convenient to subscribe, configure and move mobile telephone software service focuses on user, characterizing in that: it regards all kinds of mobile telephone service software as the carrier of the mobile telephone service. A user's mobile telephone backups and stores user description information and service description information related of the mobile telephone in service management platform after installing and starting a mobile telephone service. The user logs on the service management platform through access equipment, subscribes mobile telephone service modality and all kinds of function available, which including human computer mutual interface, after identity authorization. The user can configure service parameters through access equipment, and after subscription or configuration operation, can download the mobile telephone service software or service description information directly from service management platform, then install them to user mobile telephone. The user can log on the service management platform through a new mobile telephone when the original mobile telephone is changed. All kinds of mobile telephone service and service description information used in the original mobile telephone can be moved to the new mobile telephone selectively or as a whole after identity authorization.

Subscribing mobile telephone software service in the method comprises the following steps:

S11) the user logs on the service management platform through access equipment, and requires to subscribe mobile telephone software service after identity authorization; the subscription information of the mobile telephone software service comprises: background picture of the interface of the mobile telephone software service, prompt text and/or warning tone and all kinds of functional software modules of corresponding service;

S12) the service management platform operates the subscription requirement of the mobile telephone software service, sends message to the original access equipment, and informs the user that the subscription of the mobile telephone software service is completed after the subscription operation;

S13) through the access equipment, the user requires the service management platform to transfer the subscribed the mobile telephone service software;

S14) the service management platform sends downloading links to the equipment that the user appointed; and S15) after the subscribed mobile telephone service software is downloaded via the equipment that the user appointed by various means, the user transmits it to target mobile telephone and installs for use; methods of downloading comprises: click to download and install through the user mobile telephone after the service management platform sends message of PUSH; or the user accesses internet through computer to download, and transmits to the mobile telephone.

Configuring mobile telephone software service parameter in the method comprises the following steps:

S21) the user logs on the service management platform through access equipment, and requires to configure mobile telephone software service after identity authorization; the configuration parameters of the mobile telephone software service comprises: backup cycle of service description information, frequency of automatic detection and update of software, mode for accessing network, or other individualized service parameter; the configuration parameters are used as the portion of service description information;

S22) the service management platform operates the configuration requirement of the mobile telephone software service, sends message to the original access equipment, and informs the user that the parameter configuration of the mobile telephone software service is completed after the configuration operation;
S23) the user accesses the service management platform through mobile telephone, and after identity authorization, requires to update corresponding service parameter configuration information through the corresponding menu items/keys of the mobile telephone service software;
S24) the service management platform transfers new configuration parameters of the mobile telephone software service to the authorized user mobile telephone; and
S25) the mobile telephone service software in the user mobile telephone updates the corresponding service parameter configuration information after receiving the new configuration parameters.

Moving the mobile telephone software service in use and the description information thereof from the original mobile telephone to the new mobile telephone when the user changes mobile telephone in the method comprises the steps of:
S31) user's original mobile telephone logs on the service management platform and requires to move out one or more mobile telephone software service(s) after identity authorization;
S32) the service management platform responds and operates the requirement, and informs the original mobile telephone that: the operation of moving out the one or more mobile telephone software service(s) from the original mobile telephone is completed;
S33) user's new mobile telephone logs on the service management platform and requires to move in the one or more mobile telephone software service(s) after identity authorization;
S34) the service management platform responds and operates the requirement, and transfers service description information of the one or more mobile telephone software service(s) to the new mobile telephone; and
S35) the new mobile telephone updates local service description information of the one or more mobile telephone software service(s).

The steps S31 and S32 in the method can be omitted, in the condition that when the one or more mobile telephone software service(s) can run in several mobile telephones simultaneously, namely, these mobile telephone software service moves to another mobile telephone without, the necessity of moving out from the original mobile telephone; or as long as the mobile telephone which the mobile telephone software service be moved in can pass the identity authorization, move out the incompatible mobile telephone software service from the original mobile telephone unconditionally.

When user changes the mobile telephone in the method, if the user purchases/uses several kinds of mobile telephone software service, and intends to transmit all kinds of the mobile telephone software service and the description information used in the original mobile telephone to the new mobile telephone as a whole from the original mobile telephone, there are two methods: first, moving all kinds of the mobile telephone software service owned/ordered in the original mobile telephone together to the new mobile telephone as a whole unconditionally; and second, moving the corresponding mobile telephone software service to the new mobile telephone only after moving out it from the original mobile telephone.

The steps of the first method of moving the mobile telephone software service to the new mobile telephone from the original mobile telephone unconditionally are as follows:
S41) the user's new mobile telephone logs on the service management platform and requires to move all the mobile telephone service as a whole after identity authorization;
S42) the service management platform responds the requirement of moving as a whole, and returns the list of all kinds of mobile telephone software service to the new mobile telephone;
S43) the user selects mobile telephone software service to be moved in through the new mobile telephone, and informs the service management platform;
S44) the service management platform transfers the selected mobile telephone service software and the description information of the service to the new mobile telephone; and
S45) the new mobile telephone installs and configures the mobile telephone service software and description information of the service transferred by the service management platform locally.

In order to achieve the above object, the present invention also provides a network system, which is convenient to subscribe, configure and move mobile telephone software service focuses on user, comprises mobile communication network, internet and base station, characterizing in that the system further comprises:
Service management platform, which connects to the internet, for backuping and storing user description information of all the mobile telephone users and the service description information of all kinds of mobile telephone software service of the user mobile telephone together to the database of the service management platform server, managing these information, and identifying the mobile telephone or other access equipments which accesses the management platform server and only permits authorized user mobile telephone or other access equipment operating corresponding service;
Access equipment, through which user logs on the service management platform, for selecting suitable mode to modify user description information and corresponding service description information, and subscribe or configure all kinds of mobile telephone software service and the service description information thereof; and
Mobile telephone, microelectronic-chip of which stores the user description information for identifying each user uniquely and the service description information of all kinds of mobile telephone software service that the user configured, each service description information corresponding to one kind of mobile telephone software service.

The access equipment comprises mobile telephone, computer, telephone or interactive voice response (IVR) device, different access equipments log on the service management platform in different ways, wherein computer accesses the service management platform through WEB browser or client; mobile telephone accesses the service management platform in the internet through different access points including GPRS, EDGE, CDMA, short-message, multimedia message or voice channel; user can also dial customer service support line and communicate with customer service; or operates according to the guidance voice of interactive voice response (IVR) device to complete corresponding operation of accessing the service management platform through computer by customer service or IVR device according to the requirement of the user.

The service description information of the mobile telephone software service is used to record and set service information and configuration parameter related of the mobile telephone software service, comprising: mobile telephone refuses to receive spam message/black list and white list in e-mail service and mode of refusing, implementing key exchange algorithm and public key for mutual consulting and calculating in end to end encryption on the message transmitted by the mobile telephone; the user description information: is used to record user's individual information and mobile telephone hardware identity, comprising: user identity/password, which including the mobile telephone hardware identities of International Mobile Equipment Identity (IMEI), (also called International Mobile Equipment Identity) and SIM identity International Mobile Subscriber Identity (IMSI), user's age and sex, personal hobbies and experts.

The present invention also provides a network system, which is convenient to subscribe, configure and move mobile telephone software service focuses on user, comprises mobile communication network and base station, characterizing in that the system further comprising:

Service management platform, backups and stores all of the user description information of the mobile telephone user and the service description information of all kinds of mobile telephone software service of the user mobile telephone together to the database of the service management platform server, manages these information, and identifies the mobile telephone or other access equipments which accesses the management platform server and only permits authorized user mobile telephone or other access equipment operating corresponding service;

Access equipment, through which user logs on the service management platform, selects suitable mode to modify the user description information and corresponding service description information, and subscribe or configure all kinds of mobile telephone software services and the service description information thereof; and Mobile telephone, microelectronic-chip of which stores the user description information for identifying each user uniquely and the service description information of all kinds of mobile telephone software service that the user configured, each service description information corresponding to one kind of mobile telephone software service.

The access equipment comprises mobile telephone, computer, telephone or interactive voice response (IVR) device, wherein computer accesses service management platform through WEB browser or client.

The service description information of the mobile telephone software service is used to record and set modality, function and configuration parameters of corresponding to mobile telephone service software, comprising: black list and white list for mobile telephone refusing to receive spam message in anti-disturbance service/in e-mail service and mode of refusing, and key exchange algorithm and public key for mutual consulting and calculating implemented in end to end encryption on the message transmitted by the mobile telephone; the user description information is used to record user's individual private information and mobile telephone hardware identities, comprising: user identity/password, which including the mobile telephone hardware identities of International Mobile Equipment Identity (IMEI) and SIM card identity IMSI, user's age and sex, personal hobbies and experts.

The present invention also provides a method and a network system, which are convenient to subscribe, configure and move mobile telephone software service, focus on user. It regards all kinds of mobile telephone service software as the carrier of the service. Once stores/applies some mobile telephone service software (some of the mobile telephone service software have been installed before delivery), user should store the corresponding service description information into the service management platform together. Subsequently, the user can log on service management platform in a suitable way, and modifies the service description information of his/her mobile telephone service (including subscribing the modality and function of the service software, and configuring related parameter of service software, and so on); the user can freely download all or part of his/her mobile telephone service software and service description information from service management platform when the mobile telephone is changed, and reinstalls and reconfigures to the new mobile telephone so as to restore the environment of mobile telephone software service same as that of the original mobile telephone. The software service that the user saw is irrelevant to the type of mobile telephone from the view of the user; moreover, the user can modify the service description information of the mobile telephone software service by different means (including mobile telephone, PC computer, interactive voice response IVR device, customer service support line and so on) so as to meet the requirement of individualization; meanwhile, the user can also move all kinds of service smoothly between different mobile telephones.

In conclusion, the present invention reduces the technical threshold for the users to use mobile telephone service software. It is convenient for users to change mobile telephone, subscribe and configure individualization mobile telephone service software with a good application prospect.

DESCRIPTION OF THE EMBODIMENTS OF THE INVENTION

The present invention is further described below with reference to the appended drawings in order to make clear of the object, technical solution and advantages of the invention.

Figure 1:
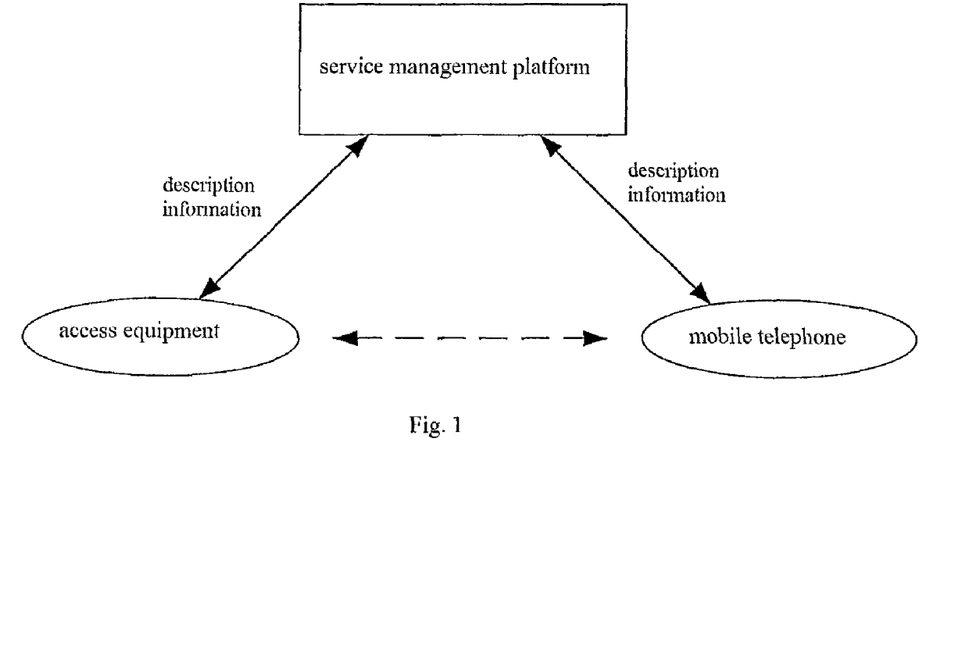
FIG. 1 is schematic diagram of network system frame to subscribe, configure and move mobile telephone software service conveniently according to the invention.

With reference to FIG. 1, besides the mobile communication network and the base station, the network system of the present invention, which is convenient to subscribe, configure and move mobile telephone software service focuses on user, is further comprised of: service management platform, access equipment and mobile telephone.

The service management platform, always connects to the internet, backups and stores all user description information of the mobile telephone user and the service description information of all kinds of mobile telephone software service of the user mobile telephone together to database of the service management platform server, manages these information, and identifies the mobile telephone or other access equipments which accesses the management platform server and only permits authorized user mobile telephone or other access equipment operating corresponding service.

The access equipment, through which user logs on the service management platform, selects suitable mode to modify the user description information and corresponding service description information, and subscribes or configures all kinds of mobile telephone software service and the service description information thereof. The access equipment may be mobile telephone, computer, telephone or interactive voice response (IVR) device. Different access equipments log on service management platform in different ways, wherein computer accesses service management platform through WEB browser or client; mobile telephone accesses service management platform in the internet through different access points including GPRS, EDGE, CDMA, short-message, multimedia message or voice channel; user can also dial customer service support line and communicate with customer service through fixed-line telephone or mobile telephone; or user can operates according to the guidance voice of interactive voice response (IVR) device to complete corresponding operation of accessing service management platform through computer by customer service or IVR device according to the requirement of the user.

The mobile telephone, microelectronic-chip of which stores the user description information for identifying each user uniquely and the service description information of all kinds of mobile telephone software service that the user configured, each service description information corresponding to one kind of mobile telephone software service.

Figure 2:
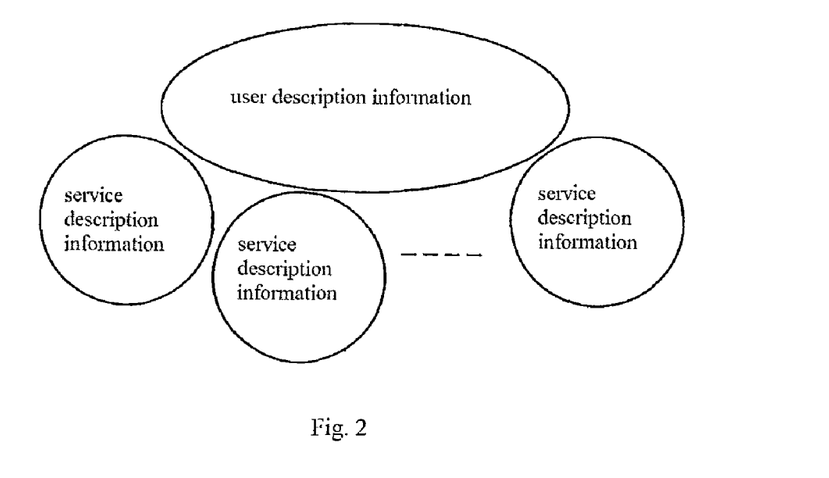
FIG. 2 is schematic diagram of the service management platform of the system in the invention stores the user description information and the service description information thereof for each mobile telephone user.

In the system of the invention, each mobile phone user has one user description information and several service description information (see FIG. 2), wherein user description information is used to record user's personal private information and his/her mobile telephone hardware identity, comprising: user's unique identity/password, which including the mobile telephone hardware identities of International Mobile Equipment Identity (IMEI) and SIM card identity IMSI, user's age and sex, personal hobbies and experts. The service description information is used to record and set modality, function and configuration parameters of related mobile telephone service software, or other individualized information of related mobile telephone service software, for example, black list and white list for mobile telephone refusing to receive spam message in anti-disturbance service/in e-mail service and mode of refusing, and key exchange algorithm and public key for mutual consulting and calculating implemented in end to end encryption on the message transmitted by the mobile telephone. Each service corresponds to one service description information.

In the present invention, all of the user description information and the service description information of the mobile telephone user are stored and managed in the service management platform. The user accesses the service management platform through access equipment (mobile telephone, PC computer (in the form of WEB browser and client), IVR device, mutual telephone, etc.), and modifies the user description information and service description information after identity authorization. Thus, it is convenient for the user to subscribe the modality and function of mobile telephone software, configure the software service, move the software service and move as a whole.

The implementing method of the invention, which is convenient to subscribe, configure and move mobile telephone software service, focuses on user. The implementing method regards all kinds of mobile telephone service software as the carrier of the service. A user mobile telephone stores user description information and service description information related of the mobile telephone in service management platform after installing and starting a mobile telephone service. The user logs on the service management platform through access equipment, subscribes mobile telephone service modality and all kinds of function available, which including human computer interface, after identity authorization. The user can configure service parameters through access equipment, and after subscription or configuration operation, downloads the mobile telephone service software or service description information from the service management platform, and installs them to user mobile telephone. The user can log on the service management platform through new mobile telephone when the mobile telephone is changed. All mobile telephone service and service description information used in the original mobile telephone can be moved to the new mobile telephone selectively or as a whole after identity authorization.

For the sake of safety, it should be authenticated before each operation in the method of the invention. The identity authorization comprises at least: username/password and hardware identity of mobile telephone (International Mobile Equipment Identity (IMEI) and SIM card identity IMSI, etc.), and the like.

Figure 3:
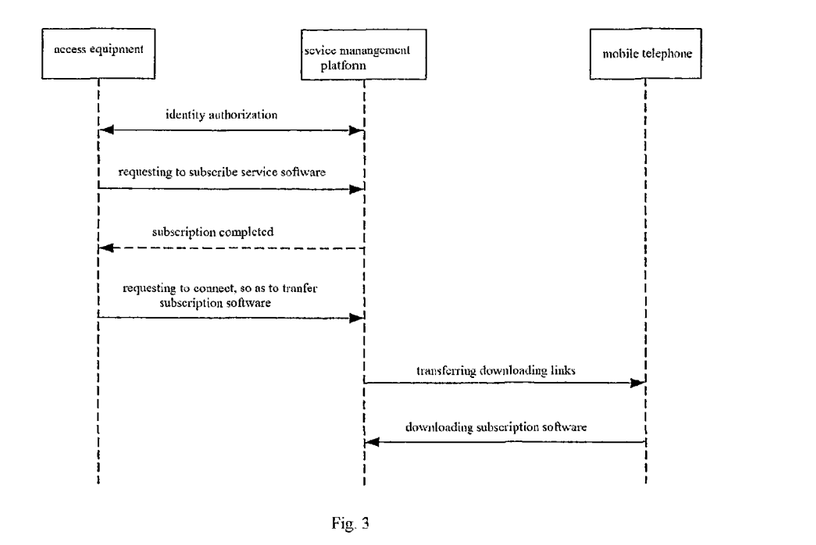
FIG. 3 is an operating and timing diagram for indicating the subscription of mobile telephone service software according to the method of the invention.

With reference to FIG. 3, the operation of subscribing the mobile telephone software service in the invention is introduced: subscribing mobile telephone software service through access equipment. The information of the subscribed mobile telephone software service comprises: the interface of the software service (including background picture, prompt text and/or warning tone, etc.), all kinds of functions of related service software (functional modules are to be needed, including obligatory function and optional function). The mobile telephone software service is transferred to user's mobile telephone to install for use by various means after subscription. The detailed steps are as follows:

S11) the user logs on the service management platform through access equipment, and requires to subscribe mobile telephone software service after identity authorization;

S12) the service management platform operates the subscription requirement of the mobile telephone software service, sends message to the original access equipment, and informs the user that the subscription of the mobile telephone software service is completed after the subscription operation;

S13) the user requires the service management platform through the access equipment to transfer the subscribed the mobile telephone service software;

S14) the service management platform sends downloading links to the equipment that the user appointed; and S15) after the subscribed mobile telephone service software is downloaded via the equipment that the user appointed (mobile telephone or PC computer), the user transmits it to target mobile telephone and installs for use. The modes of downloading comprising: click to download and install through the user mobile telephone after the service management platform sends message of PUSH; or the user accesses internet through computer to download and transmit to the mobile telephone.

Figure 4:
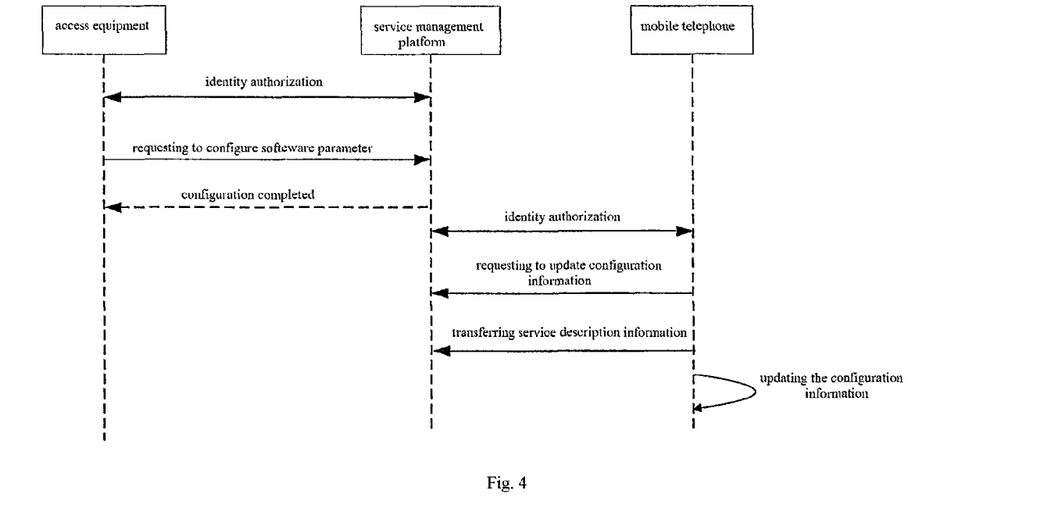
FIG. 4 is an operating and timing diagram for indicating the configuration of mobile telephone service software parameters according to the method of the invention.

With reference to FIG. 4, the operation of configuring the service parameters of the mobile telephone software service in the invention is introduced: configuring service parameters of the mobile telephone software service through access equipment. The configuration parameters used for service description information comprises: backup cycle of service description information, frequency of automatic detection and update of software, mode for accessing network, or other individualized service information related to the service, such as black and white lists, mode of refusing, subgroup of the address list, etc. in anti-disturbance service of the mobile telephone, safe address list and public key, etc. in the short-message encryption service of the mobile telephone and so on. Configuration information can be downloaded through access equipment after the configuration so as to complete the configuration of service parameters of the mobile telephone software. The detailed steps are as follows:

S21) the user logs on the service management platform through access equipment, and requires to configure mobile telephone software service after identity authorization;

S22) the service management platform operates the configuration requirement of the mobile telephone software service, sends message to the original access equipment, and informs the user that the parameter configuration of the mobile telephone software service is completed after the configuration operation;

S23) the user accesses the service management platform through mobile telephone, and after identity authorization, requires to update corresponding service parameter configuration information through the corresponding menu items/keys of the mobile telephone service software;

S24) the service management platform transfers the new configuration parameters of the mobile telephone software service to the user mobile telephone; and S25) the mobile telephone service software in the user mobile telephone updates the corresponding service parameter configuration information after receiving the new configuration information.

Figure 5:
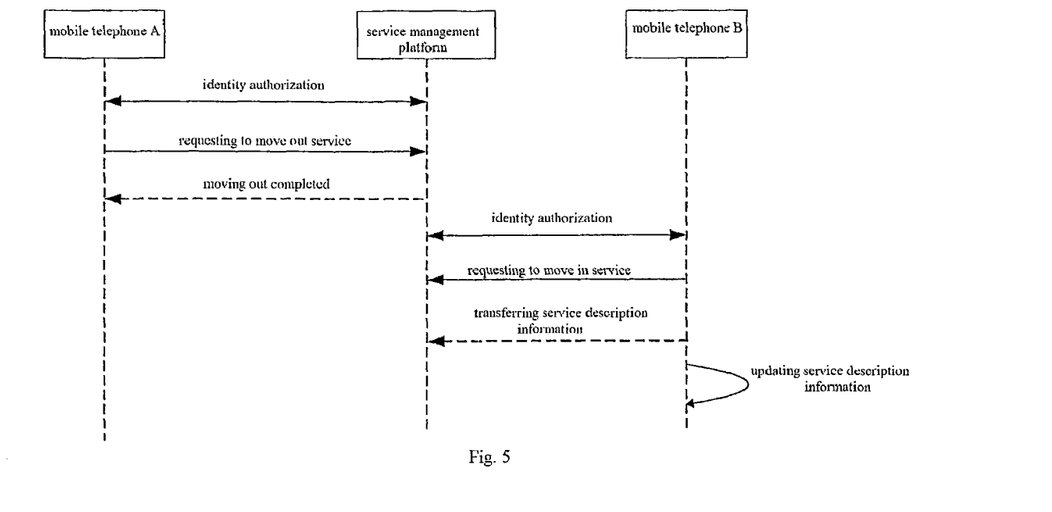
FIG. 5 is an operating and timing diagram for indicating the movement of mobile telephone service software to the new mobile telephone according to the method of the invention.

With reference to FIG. 5, the operation method of moving mobile telephone software service of the invention is introduced: moving the mobile telephone software service in use and the description information thereof (including various favorite setting and configuration parameters, etc.) from the original mobile telephone to the new mobile telephone when the user changes mobile telephone, so that the user can obtain consistent service from different mobile telephones and thereby the software service that the user saw is irrelevant to the type of mobile telephone from the view of the user. The detailed steps are as follows:

S31) the user's original mobile telephone A logs on the service management platform and requires to move out one or more mobile telephone software service(s) from the original mobile telephone A after identity authorization;

S32) the service management platform responds and operates the requirement, and informs the original mobile telephone A that: the operation of moving out the one or more mobile telephone software service(s) from the original mobile telephone A is completed;

S33) the user's new mobile telephone B logs on the service management platform and requires to move the one or more mobile telephone software service(s) in the new mobile telephone B after identity authorization;

S34) the service management platform responds and operates the requirement, and sends service description information of the one or more mobile telephone software service(s) to the new mobile telephone B; and S35) the new mobile telephone B updates local service description information of the one or more mobile telephone software service(s).

Since some mobile telephone software services can be run in several mobile telephones simultaneously, namely, when these mobile telephone software services are moved in a new mobile telephone, it is not necessary to move out them from the original mobile telephone, thus the above steps S31 and S32 can be omitted. Furthermore, there is another way, if need: as long as the mobile telephone B to be moved in can pass the identity authorization, moving out the incompatible mobile telephone software service from the mobile telephone A unconditionally, that steps S31 and S32 can also be omitted.

When the user purchases/uses several kinds of mobile telephone software service, the present invention provides a method to move all kinds of software service as a whole in convenient for the user to move all kinds of software service to a new mobile telephone at one time. In the operation of moving all kinds of software service to a new mobile telephone as a whole, the strategy of moving out the service is similar to that of the movement of single mobile telephone service, there can be two methods: first, moving all kinds of mobile telephone software service owned/ordered in the original mobile telephone together to the new mobile telephone unconditionally; and second, moving all the rest mobile telephone software service to the new mobile telephone only after moving out the related mobile telephone software service from the original mobile telephone.

Figure 6:
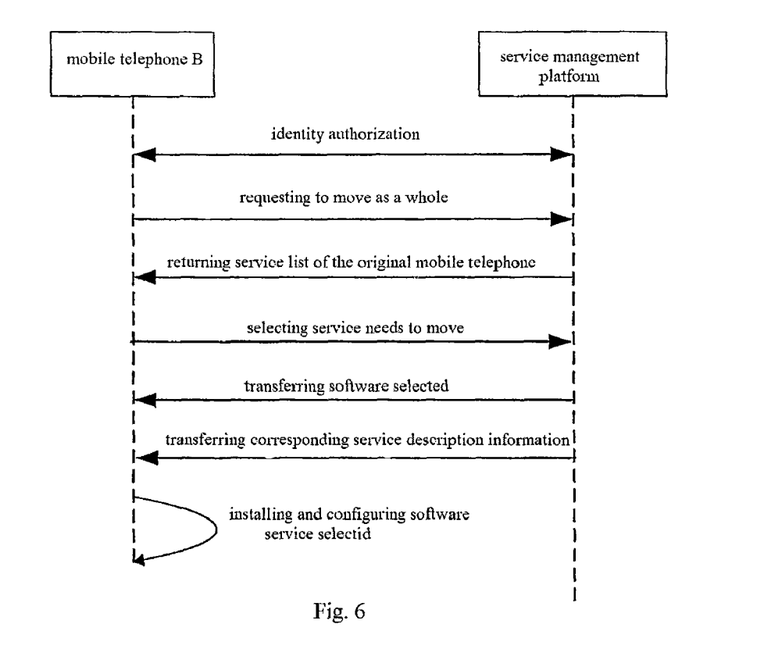
FIG. 6 is an operating and timing diagram for indicating the movement of the original mobile telephone service software to the new mobile telephone as a whole according to the method of the invention.

With reference to FIG. 6, the steps of the first method are described as follows:

S41) the user's new mobile telephone B logs on the service management platform and requires to move all the mobile telephone service as a whole after identity authorization;

S42) the service management platform responds the requirement of moving all the mobile telephone service as a whole, and returns the list of all kinds of mobile telephone software service to the new mobile telephone B;

S43) the user selects the mobile telephone software service to be moved through the new mobile telephone B and informs the service management platform;

S44) the service management platform transfers the selected mobile telephone service software and description information of the service to the new mobile telephone B; and S45) the new mobile telephone B locally installs and configures the mobile telephone service software and description information of the service transferred by the service management platform.

The invention claimed is:

1. A method of obtaining mobile telephone service software for use in a mobile telephone of a user, the method comprising:

backing up and storing, in a service management platform, user description information and service description information related to the mobile telephone of the user;

sending, by an access equipment to the service management platform, a request of the user for a subscription to the mobile telephone service software, the access equipment being different than the mobile telephone of the user;

processing, by the service management platform, the subscription request of the user;

indicating, by the access equipment to the service management platform, a device to which to transfer the subscribed mobile telephone service software;

transferring, by the service management platform to the indicated device, the subscribed mobile telephone service software;

transmitting, by the indicated device to the mobile telephone of the user, the subscribed mobile telephone service software received from the service management platform; and installing, at the mobile telephone of the user, the subscribed mobile telephone service software received from the indicated device, for use in the mobile telephone of the user.

2. The method according to claim 1,
wherein service description information of the mobile telephone service software comprises:
a background picture of an interface of the mobile telephone software service,
a prompt text and/or a warning tone, and
functional software modules corresponding to the mobile telephone service software; and
wherein transmitting the subscribed mobile telephone service software to the mobile telephone comprises:
clicking, by the user, to download to the user mobile telephone after the service management platform sends a PUSH message; or
accessing, by the user, the internet through a computer to download and transmit the subscribed mobile telephone service software to the mobile telephone.

3. The method according to claim 1, wherein sending the request of the user for a subscription is performed only after the user has been authorized by the service management platform.

4. The method according to claim 1, further comprising informing the access equipment, by the service management platform, when the subscription of the mobile telephone service software has been completed.

5. The method according to claim 1, wherein transferring the subscribed mobile telephone service software comprises sending downloading links, by the service management platform, to the indicated device.

6. A method of configuring parameters of mobile telephone service software used in a mobile telephone of a user, the method comprising:
backing up and storing, in a service management platform, user description information and service description information related to the mobile telephone of the user;
sending, by an access equipment to the service management platform, a request of the user to configure parameters of the mobile telephone service software, the access equipment being different than the mobile telephone of the user;
performing, by the service management platform, the parameter configuration of the mobile telephone service software;
sending, by the mobile telephone of the user to the service management platform, a request of the user to update the parameters of the mobile telephone service software residing on the mobile telephone of the user;
transferring, by the service management platform to the mobile telephone of the user, new configuration parameters corresponding to the mobile telephone service software; and
updating, by the mobile telephone service software in the mobile telephone of the user, the corresponding service parameter configuration information after receiving the new configuration parameters.

7. The method according to claim 6,
wherein the configuration parameters of the mobile telephone service software comprises:
a backup cycle of service description information,
a frequency of automatic detection and update of software,
a mode for accessing a network; and
wherein the configuration parameters are used as a portion of the service description information.

8. The method according to claim 3, wherein sending the request of the user to configure parameters of the mobile telephone service software is performed only after the user has been authorized by the service management platform.

9. The method according to claim 6, further comprising informing the access equipment, by the service management platform, when the parameter configuration of the mobile telephone service software has been completed.

10. The method according to claim 6, wherein sending the request of the user to update parameters of the mobile telephone service software residing on the mobile telephone is performed only after the user has been authorized by the service management platform.

11. A method of moving mobile telephone service software from a first mobile telephone of a user to a second mobile telephone of the user, the method comprising:
backing up and storing, in a service management platform, user description information and service description information related to the first mobile telephone of the user;
sending, by the second mobile telephone to the service management platform, a request of the user to move the mobile telephone service software into the second mobile telephone;
sending, by the service management platform, the backed up service description information of the first mobile telephone to the second mobile telephone; and
updating, by the second mobile telephone, local service description information of the second mobile telephone based on the service description information of the first mobile telephone received from the service management platform.

12. The method according to claim 11, further comprising, before sending the request of the user to the service management platform to move the mobile telephone service software into the second mobile telephone:
sending, by the first mobile telephone to the service management platform, a request of the user to move the mobile telephone service software out of the first mobile telephone; and
performing, by the service management platform, the moving out of the mobile telephone service software from the first mobile telephone.

13. The method according to claim 11, wherein sending the request of the user to move the mobile telephone service software into the second mobile telephone is performed only after the user has been authorized by the service management platform.

14. The method according to claim 11, further comprising informing the second mobile telephone, by the service management platform, when the moving of the mobile telephone service software into the second mobile device has been completed.

15. The method according to claim 11,
wherein sending the request of the user to move the mobile telephone service software into the second mobile telephone comprises sending a request to move the mobile telephone service software as a whole into the second mobile telephone; and
wherein the method further comprises:
sending, by the service management platform to the second mobile telephone, a list of the mobile telephone service software programs associated with the first mobile telephone;
selecting, by the user at the second mobile telephone, one of the mobile telephone service software programs from the list;

informing the service management platform, by the second mobile telephone, of the mobile telephone service software programs selected by the user;

sending, by the service management platform to the second mobile telephone, the mobile telephone service software program selected by the user; and installing, at the second mobile telephone, the mobile telephone service software program selected by the user.

16. The method according to claim 12, wherein sending the request of the user to move the mobile telephone service software out of the first mobile telephone is performed only after the user has been authorized by the service management platform.

17. The method according to claim 12, further comprising informing the first mobile telephone, by the service management platform, when the moving out of the mobile telephone service software from the first mobile device has been completed.

18. A system configured to be used with a mobile communication network, the system comprising:

a mobile telephone that stores user description information corresponding to a user of the mobile telephone and stores service description information corresponding to mobile telephone service software of the mobile telephone;

access equipment different than the mobile telephone; and a service management platform having a database that backs up and stores the user description information corresponding to the user of the mobile telephone and the service description information corresponding to the mobile telephone service software of the mobile telephone, the service management platform being configured to manage the user description information and the service description information, and to identify the mobile telephone and the access equipment that accesses the management platform server;

wherein the access equipment is configured to allow the user of the mobile telephone to log on to the service management platform through the access equipment:

to subscribe to the mobile telephone service software of the mobile telephone;

to select a suitable mode to modify the user description information corresponding to the user of the mobile telephone and the service description information corresponding to the mobile telephone service software of the mobile telephone; and to configure parameters of the mobile telephone service software and the service description information thereof.

19. The system according to claim 18, wherein the access equipment comprises a mobile telephone, a computer, a telephone or an interactive voice response (IVR) device.

20. The system according to claim 18, wherein the service description information of the mobile telephone service software comprises configuration parameters of the mobile telephone service software; and the user description information comprises individual information of the user and mobile telephone hardware identity.

21. The system according to claim 18, wherein the access equipment logs on to the service management platform using the internet.

* * * * *